United States Patent [19]

Stolper

[11] 3,953,870
[45] Apr. 27, 1976

[54] LIGHT TRAP

[76] Inventor: David Owen Stolper, 105 Winchester St., Apt. 3, Brookline, Mass. 02146

[22] Filed: Mar. 25, 1975

[21] Appl. No.: 561,883

[52] U.S. Cl. .............................................. 354/277
[51] Int. Cl.² ...................................... G03B 17/26
[58] Field of Search .................................. 354/277

[56] References Cited
UNITED STATES PATENTS
356,072   1/1887   Leland .............................. 354/277

*Primary Examiner*—John Gonzales
*Attorney, Agent, or Firm*—William Nitkin

[57] ABSTRACT

An improved light trap for use in conjunction with photographic equipment consisting of a frame and an exposure-controlling slide slideably mounted between two longitudinal edges of the frame, the light trap comprising in combination a first flat spring member disposed in a recess in the frame arranged both to bias the slide against a portion of the frame and, upon removal of the slide, to contact an opposite portion of the frame; and a second flat spring member disposed in a recess in the frame on the opposite side of the slide from the first spring member also arranged both to bias the slide against a portion of the frame and, upon removal of the slide, to contact an opposite portion of the frame. Additionally compressible strips may be positioned along those portions of the frame contacted by the springs to further seal the frame against light intrusion.

4 Claims, 7 Drawing Figures

LIGHT TRAP

BACKGROUND OF THE INVENTION

1. Field of the Invention

The invention resides in the field of light traps and more particularly relates to an improved light trap or light seal construction employing spring members and compressible light blocking strips.

2. Description of the Prior Art

There is a great variety of light traps used on photographic equipment, many of which are patented and form a body of art in this area. As films have become more and more sensitive, newer light traps have become necessary and the current extremely high speed Polaroid film necessitated the development of the device of this invention. Some prior light traps have involved the use of felt or other tufted materials arranged so that the exposure-controlling slide makes contact with this material and the tufts then act as a barrier to the light preventing exposure of the film. Another type of light trap utilizes a light seal composed of rubber or other resilient material pressing against the exposure-controlling slide similar to a window squeegee against a pane of glass and when the slide is removed, the rubber element then seals against the opposite member of the light trap. Further light traps have been developed in the area of fabric or other cushioning materials covering metal spring elements structured so that they are mounted transversely to the movement of the exposure-controlling slide and when the exposure-controlling slide is removed, the spring urges the fabric or cushion to close the guideway by making contact with the opposite member of the light trap.

All of the above styles of light traps, even though they worked quite well with lower speed films, have proved unsatisfactory in blocking light from the latest high speed films which are ten to thirty times more sensitive to light than the films in existence when the above mentioned light traps were first developed.

SUMMARY

The present invention is a light trap of the type which is employed with an exposure-controlling slide slideably mounted in a frame between a first and second plate, which plates contain an opening through which the film may be exposed and which the exposure-controlling slide when in position covers the film preventing light from striking it and when removed allows light to strike the film. The light trap is comprised of a spring member transversely mounted within a recess on the exposure-controlling slide side of the first plate of the frame, the spring extending the width of the exposure-controlling slide and having an inherent tension in its structure so that when the exposure-controlling slide is removed, the spring snaps shut making contact along its complete unattached edge with the opposite second plate of the frame. The area on the second plate where the first spring makes contact is comprised of the attached base of a second spring similar in nature to the first spring but which when the exposure-controlling slide is removed snaps shut making contact with the first plate. It has been found that this double spring light trap prevents the fogging of high speed film that other conventional light traps allow. This dual system of springs works better than the present art because any light which might be admitted by the first spring is blocked by the second spring. Also as one removes the exposure-controlling slide, the second spring closes before the exposure-controlling slide is removed and blocks any light which might be admitted during the closure and sealing of the first spring. A variation of the foregoing utilizes springs which instead of making contact only with the opposite plates make contact with a compressible strip member affixed to the opposite plate of the plate in which the spring is mounted, such compressible member being in the nature of a compressible tape or equivalent material. This variation employing a compressible member which is compressed by the spring when it closes may be used successfully with only one spring member rather than with two spring members.

The device of this invention, although developed for use with high speed Polaroid films, can be employed as a light trap with many other types of film and equipment. Also the device of this invention can be used in situations where the exposure-controlling slide mechanism must occupy an extremely narrow width within the film plane.

A further advantage of this light trap is that it is composed of metallic materials rather than felt materials, the former being unaffected by moisture or chemicals. Another advantage of the dual spring light trap is that a perfect contact along the junction surface between the springs and their respective opposite plates is not absolutely necessary for if the first spring member and second spring member do not make actual contact with their respective opposite plates, as long as they are in close proximity to the plates, the two springs acting together form a light baffle and what light may pass between the plate and the first spring is effectively blocked by the second spring.

These and other features and objects of the invention will become clearer from the description of the preferred embodiment and drawings which follow.

DESCRIPTION OF THE PREFERRED EMBODIMENT

Figure 1:
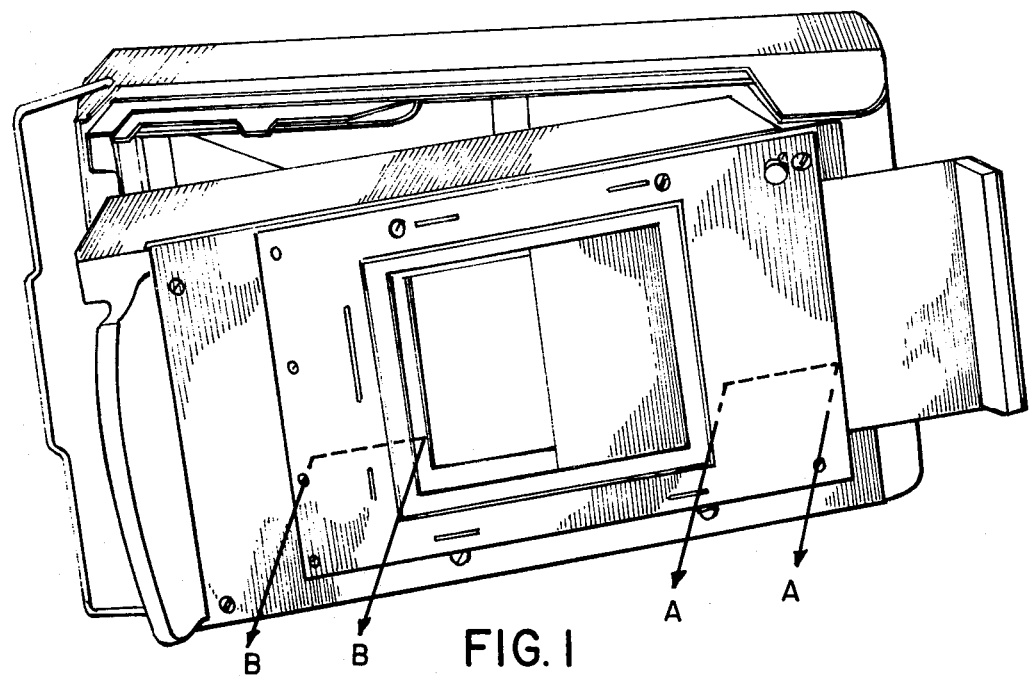
FIG. 1 is a perspective view of a film holder pack showing the exposure-controlling slide partially inserted.
Figure 2:
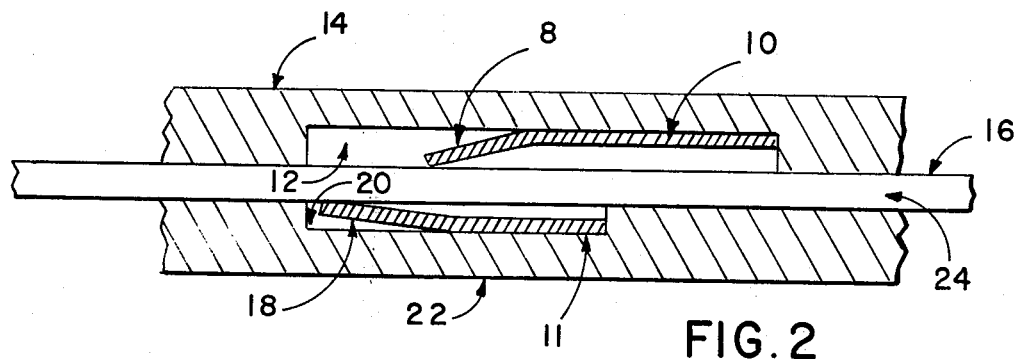
FIG. 2 is a cross sectional view through section A—A of FIG. 1 with the exposure-controlling slide inserted.
Figure 3:
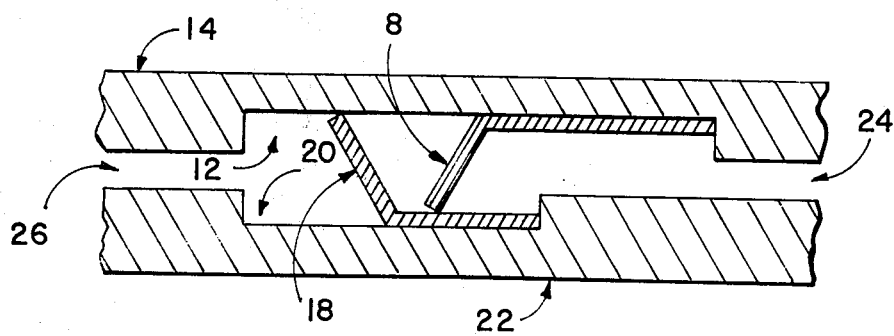
FIG. 3 is a cross sectional view through section A—A of FIG. 1 with the exposure-controlling slide removed.

With reference to the drawings the device of this invention is contained within a film pack as illustrated in FIG. 1. FIG. 2 shows a cross section through section A—A of FIG. 1 and illustrates the device of this invention as being comprised of a first flat spring member 8 mounted at one end 10 in recess 12 in first plate 14 and depressed into recess 12 by an exposure-controlling slide 16 and a second flat spring member 18 mounted within recess 20 in a second plate 22. These springs may be made of 0.003 inch thick phosphor bronze or copper berylium for example or an equivalent metal alloy or material which has a spring temper. The springs are mounted in their respective recesses using for example an anaerobic quick-setting adhesive such as Loctite 312 or an equivalent. This gluing takes place as illustrated in FIG. 2 at the area indicated by reference numbers 10 and 11. Other methods may be employed to successfully mount these springs. In FIG. 3 the exposure-controlling slide is removed from area 24 and the springs 8 and 18 have snapped into the opposite recesses 20 and 12, respectively, thereby sealing area 26 from any light that might come from area 24.

Figure 4:
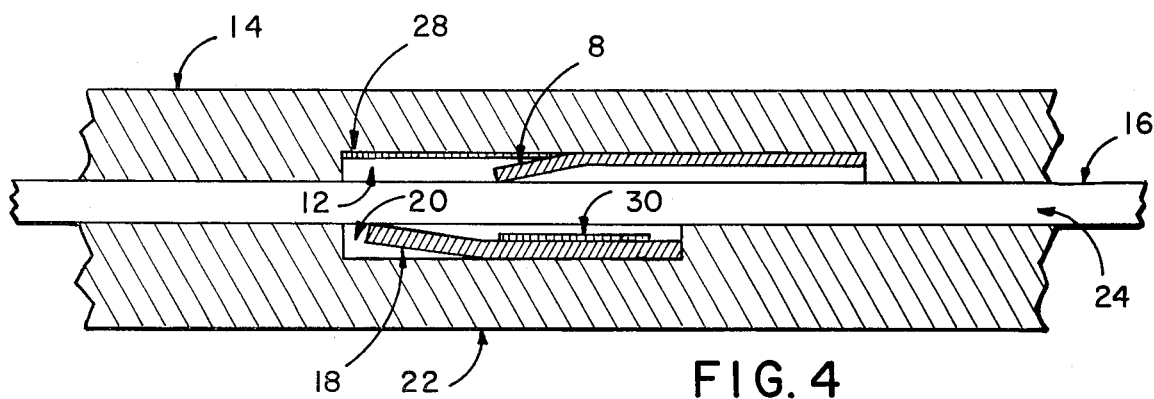
FIG. 4 is a cross sectional view through section A—A of FIG. 1 with the exposure-controlling slide inserted and compressible strip members illustrated.
Figure 5:
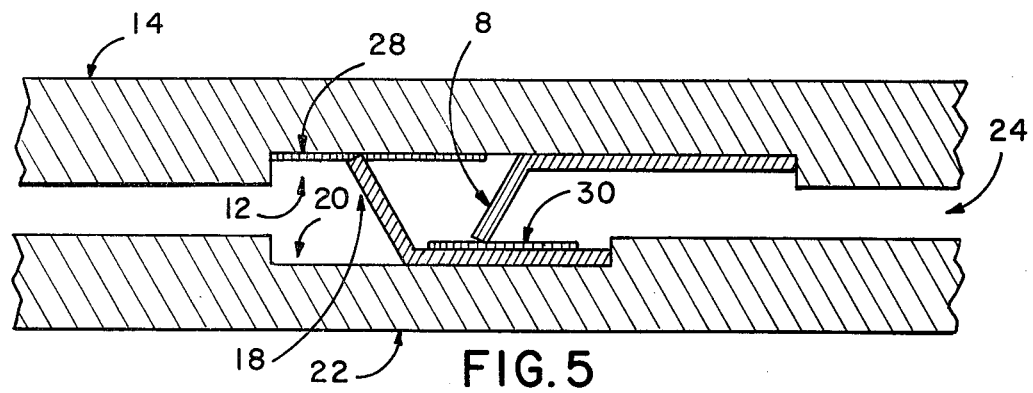
FIG. 5 is a cross sectional view through section A—A of FIG. 1 with the exposure-controlling slide removed and compressible strip members illustrated.

FIG. 4 and FIG. 5 illustrate an alternate embodiment of the invention in which springs 8 and 18 close on compressible strip members 30 and 28, respectively, when exposure-controlling slide 16 is removed as shown in FIG. 5.

Figure 6:
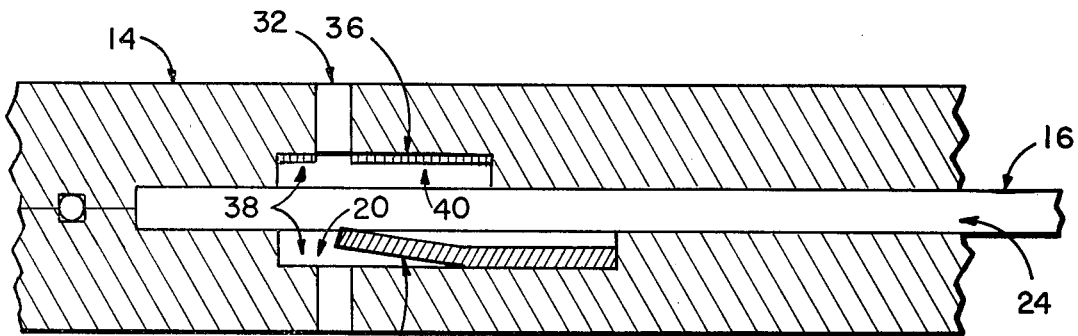
FIG. 6 is a cross sectional view through section B—B of FIG. 1 with the exposure-controlling slide inserted and one spring and compressible strip member illustrated.
Figure 7:
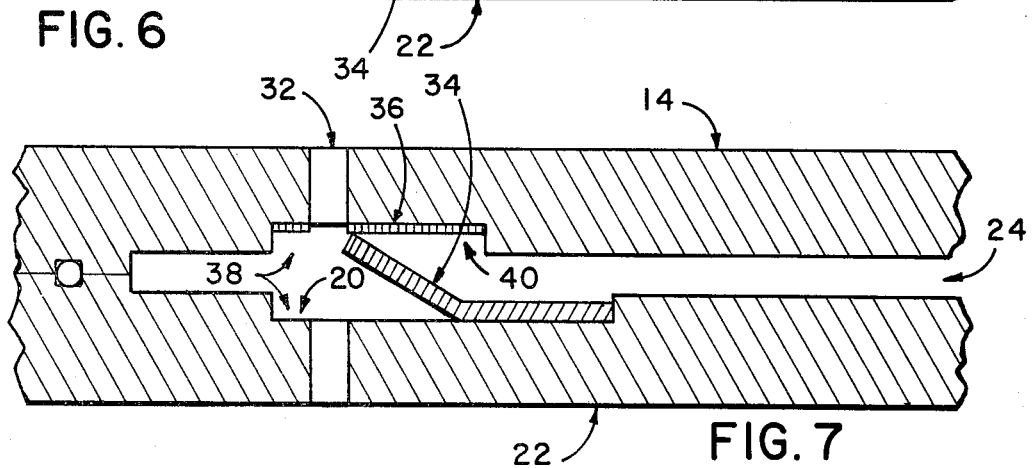
FIG. 7 is a cross sectional view through section B—B and one spring and compressible member illustrated.

FIG. 6 illustrates the single spring light trap where the intruding light comes from area 32. When exposure-controlling slide 16 is removed, single spring 34 snaps shut and makes contact with compressible member 36 thereby blocking any light within chamber 38 from entering chamber 24 which leads to the area of the light-sensitive film. Compressible member 36 can be made of a soft, flat, thin resilient material attached within recess 40 in first plate 14. This single spring can be composed of the same material as the dual spring illustrated in FIGS. 2 – 5 and may be affixed within its recess in the second plate by similar methods as the dual spring illustrated in FIGS. 2 – 5. When the exposure-controlling slide is removed, single spring 34 makes contact with compressible material 36 and forms a light seal by its contact and compression of the compressible material as shown in FIG. 7.

MODE OF OPERATION OF INVENTION

The usual mode of operation is first to mount the film holder upon or within a camera. When one desires to have the film plane exposed to light coming through the optical system of the camera, one removes the exposure-controlling slide. The dual springs then snap shut at the exact instant of removal, preventing light from entering through the exposure-controlling slide's opening. The single spring also works in a similar manner. When the exposure-controlling slide is removed, the single spring closes across the opening of the exposure-controlling slide and makes contact with the compressible material in the recess located in the opposite plate thereby blocking entrance of light into the film area.

What I claim is:

1. In a photographic film pack adapter for cameras comprising a frame and exposure-controlling slide slideably mounted between two longitudinal edges thereof, a light trap for preventing light from entering said frame through a transverse edge thereof, said light trap comprising in combination:
    a first plate mounted in said frame along said transverse edge, said plate having a recessed portion disposed along its length;
    a second plate mounted in said frame parallel to said first plate spaced apart from said first plate a distance sufficient to receive said exposure-controlling slide, said second plate having a recessed portion disposed along its length;
    a first flat spring member disposed in said first plate recess arranged to bias said slide against said second plate;
    a second flat spring member disposed in said second plate recess arranged to bias said slide against said first plate; and
    said first spring further arranged to contact said second plate recessed portion upon removal of said slide, and said second spring further arranged to contact said first plate recessed portion upon removal of said slide.

2. A device as recited in claim 1 further including:
    a first compressible strip member disposed in said first plate recess for receiving the edge of said second spring member upon removal of said slide; and
    a second compressible strip member disposed in said second plate recess for receiving the edge of said first spring member upon removal of said slide.

3. A device as recited in claim 2 further including a second compressible strip member disposed in said second plate recess atop a portion of said second spring member for receiving the edge of said first spring member upon removal of said slide.

4. In a photographic film pack adapter for cameras comprising a frame and exposure-controlling slide slideably mounted between two longitudinal edges thereof, a light trap for preventing light from entering said frame through a transverse edge thereof, said light trap comprising in combination:
    a first plate mounted in said frame along said transverse edge, said plate having a recessed portion disposed along its length;
    a second plate mounted in said frame parallel to said first plate spaced apart from said first plate a distance sufficient to receive said slide, said second plate having a recessed portion disposed along its length;
    a flat spring member disposed in said first plate recess arranged to bias said slide against said second plate; and
    a compressible member disposed in said second plate recess for receiving the edge of said flat spring member upon removal of said slide.

* * * * *